United States Patent [19]

Negoro et al.

[11] 4,436,416
[45] Mar. 13, 1984

[54] MIRROR SCANNING CONTROL MECHANISM IN VARIABLE MAGNIFICATION TYPE COPYING MACHINE

[75] Inventors: Ikuo Negoro; Hisao Iwanade, both of Tokyo, Japan

[73] Assignee: Asahi Kogaku Kogyo Kabushiki Kaisha, Tokyo, Japan

[21] Appl. No.: 326,977

[22] Filed: Dec. 3, 1981

[30] Foreign Application Priority Data

Dec. 11, 1980 [JP] Japan .................................. 55-174989

[51] Int. Cl.³ ...................... G03B 27/34; G03B 27/40; G03B 27/70

[52] U.S. Cl. ........................................ 355/57; 355/8; 355/11; 355/51

[58] Field of Search .................... 355/57, 60, 51, 8, 11

[56] References Cited

U.S. PATENT DOCUMENTS 3,709,602  1/1973  Satomi .............................. 355/57 X
4,322,159  3/1982  Takahashi et al. .................... 355/57

Primary Examiner—Richard A. Wintercorn
Attorney, Agent, or Firm—Sughrue, Mion, Zinn, Macpeak and Seas

[57] ABSTRACT

The scanning speed and distance of a full-speed mirror are continuously variable in accordance with the copying sheet size, magnification factor and original size.

12 Claims, 8 Drawing Figures

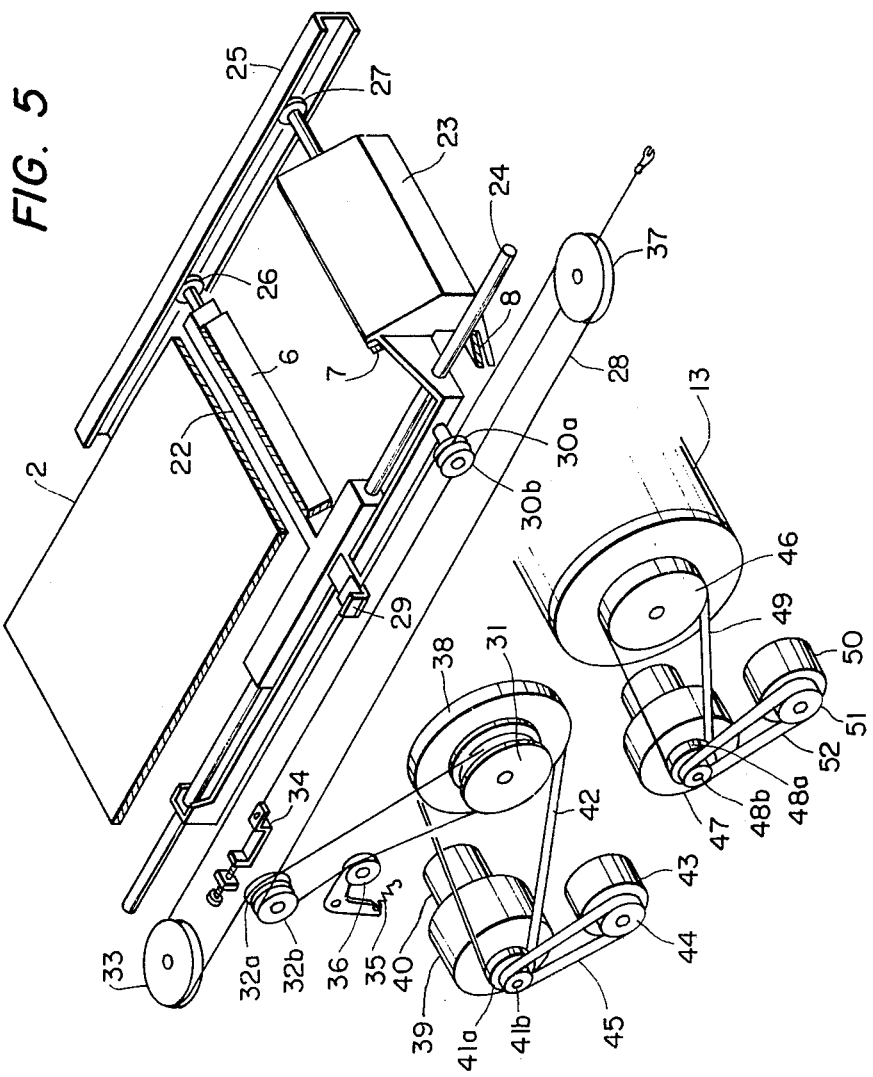

MIRROR SCANNING CONTROL MECHANISM IN VARIABLE MAGNIFICATION TYPE COPYING MACHINE

BACKGROUND OF THE INVENTION

This invention relates to a mirror scanning control mechanism in a variable magnification type copying machine the magnification factor of which can be changed (increased or decreased).

In a conventional variable magnification type copying machine of this type, the range of enlarging and reducing magnification factors is generally limited as shown in FIG. 1(a). With such a conventional copying machine, a copying operation from one standard size to another standard can be carried out, for instance standard size "A4" can be enlarged into standard size "A3" (the magnification factor being 1.414×), and standard size "A3" can be contracted into standard size "A4" (the magnification factor being 0.707×), or standard size "A3" can be contracted into standard size "B4" (the magnification factor being 0.813×) during the copying operation. However, when the size of an original is not one of the standard sizes as indicated by the point P in FIG. 1(a), its available copying sizes are as indicated by the points P', P" and P''' depending on the magnification factors, because the enlarging or contracting magnification factor is limited as described above. Therefore, it is impossible to increase or decrease the size of the original to a desired standard size. Even if the size of the original could be increased or decreased into the desired size in the copying operation, the image of the original would not be suitable in size with respect to the size of a copying sheet, i.e., the length-to-width ratio of the copying sheet may not be the same as that of the original. Accordingly, sometimes blanks are formed on the copying sheet, or in one dimension the image of the original is too large to be copied on the copying sheet.

This drawback is caused by the fact that the scanning operation of a full-speed mirror having a light source adapted to illuminate an original in a scanning mode, and the scanning operation of half-speed mirrors adapted to transmit to a zoom lens magnification varying device light reflected from the original which is transmitted thereto from the full-speed mirror, are carried out by a speed changer which is driven by a motor rotating only at a constant speed and which has a limited number of speed changes.

SUMMARY OF THE INVENTION

In view of the above-described drawback accompanying a conventional variable magnification type copying machine, a first object of this invention is to provide a mirror scanning control mechanism in which the size of an original which is not any one of the standard sizes as shown in FIG. 1(b), or as indicated by the point P in FIG. 1(b) can be increased or decreased to a desired standard size by suitably selecting a copying magnification factor in the copying operation.

It is a second object of this invention to limit the mirror scanning distance to only a minimum necessary value, to thereby reduce the scanning time and to extend towards the half-speed mirrors the region of movement of a lens system in the magnification varying device when the magnification factor is set for enlargement.

Briefly, these and other objects are achieved according to the present invention by providing a numerical control system for controlling the movement speed, direction and distance of the full-speed scanning mirror unit. Buffer memories provide data representing the magnification ratio, scanning direction, copying sheet size, scanning distance and scanning speed and a pulse generator provides pulses to a numerical control type motor. The scanning distance and scanning speed can then be continuously variable with changes in the magnification factor and copying sheet size.

BRIEF DESCRIPTION OF THE DRAWINGS

In the drawings:

FIG. 5 is a perspective view showing the inside arrangement of a copying machine according to one embodiment of this invention;

DETAILED DESCRIPTION OF THE INVENTION

Figure 1A:
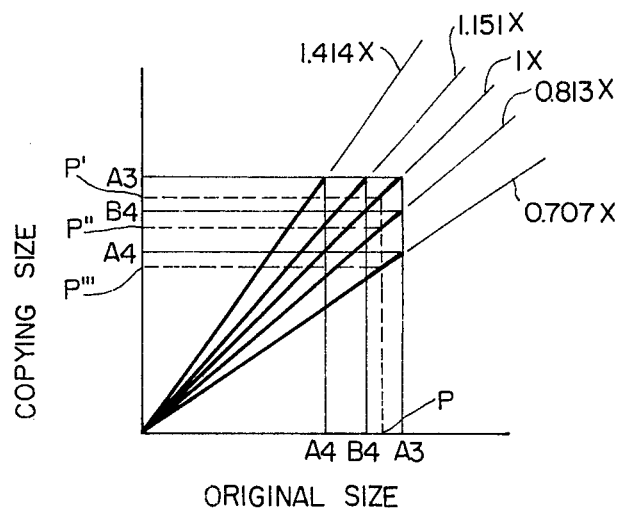
FIGS. 1(a) and 1(b) are graphical representations indicating relationships between original sizes, copying magnification factors and copying sizes.
Figure 1B:
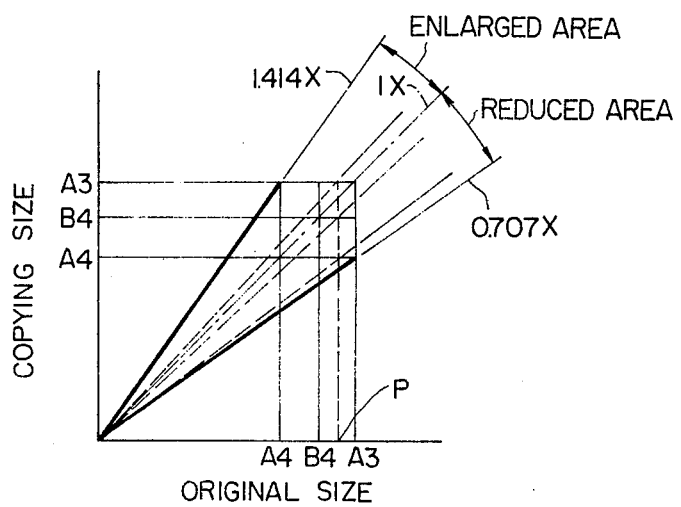

Before one embodiment of this invention is described in detail with reference to the accompanying drawings, for a fuller understanding of a mirror control mechanism according to this invention, a mirror scanning speed and scanning distance will be described with reference to FIGS. 2, 3 and 4.

First, the mirror scanning speed will be described. FIG. 2 is an explanatory diagram showing a process in which an original 1 on a contact glass 2 is subjected to magnification variation by the zoom lens system 9 of a magnification varying unit 11 and the image of the original 1 thus treated is formed on a photo-snesitive drum 13 through a reflecting mirror 10. A full-speed mirror 6 is driven by a motor or the like as follows. The mirror 6 is accelerated from its predetermined stop position, so that its speed reaches a scanning speed determined from a magnification factor before the mirror 6 reaches the edge of the original. Then, after illuminating the entire original surface while maintaining the scanning speed, the mirror 6 is decelerated at a position sufficiently beyond the length of the original 1 and is then stopped. The mirror 6 thus stopped is returned to its initial stop position. Half-speed mirrors 7 and 8 are adapted to apply light reflected from the original 1 to the zoom lens system 9. In order to maintain the distance between an object and its image (hereinafter referred to as "an object-image distance") constant, the half-speed mirrors 7 and 8 scan only as much as a half of the full-speed mirror's scanning distance at a half of the full-speed mirror's scanning speed.

Figure 2:
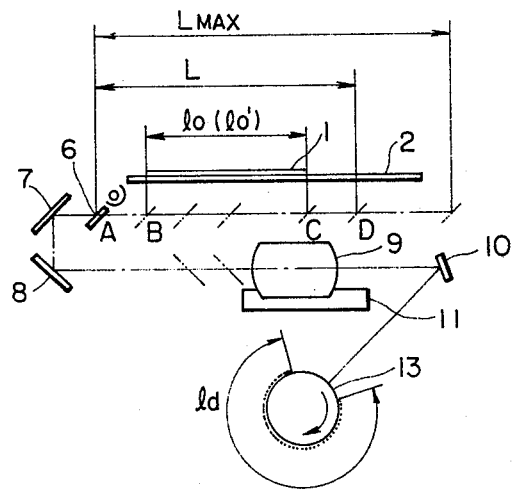
FIG. 2 is an explanatory diagram for a description of the operation of a copying machine.

If it is assumed that, in FIG. 2, the original 1 has a length $l_0$, the original's magnified image formed on the outer wall of the photo-sensitive drum 13 has a length $l_d$, the full-speed mirror illuminating and scanning the original has a scanning speed $V_m$, the photo-sensitive drum 13 has a peripheral speed $V_d$, and a copying magnification factor is represented by M, then the original's image length $l_d$ can be represented by the following expression (1):

$$l_d = M \times l_0 \quad (1)$$

Since the time required for the full-speed mirror 6 to scan the original's length $l_0$ is equal to the time required for the photo-snesitive drum 13 to turn as much as the image's length, the following relation is held:

$$\frac{l_0}{V_m} = \frac{l_d}{V_d} \quad (2)$$

From the expression (1) and (2), the scanning speed of the full-speed mirror 6 is:

$$V_m = \frac{1}{M} V_d \quad (3)$$

In general, the photo-sensitive drum 13 turns at a constant speed during the mirror scanning operation, and the speed of rotation of the photo-sensitive drum 13 is independent of a copying magnification factor. Therefore, in the case of the copying magnification factor M, the full-speed mirror 6 should scan at a speed which is 1/M of the peripheral speed of the photo-sensitive drum 13.

Next, the mirror scanning distance will be described. From the expression (1), the original's length $l_0$ is:

$$l_0 = \frac{l_d}{M}$$

The original's image ($l_d$) formed on the outer wall of the photosensitive drum 13 is transferred onto a copying sheet, but the copying sheet is generally of a standard size such as for instance a column A or B size; that is, the size of the copying sheet is predetermined. In addition, the copying magnification factor M is an input data of the copying machine which the operator selects independently of the size of the original before starting a copying operation. Therefore, the range $l_0'$ of the original which can be copied is predetermined by the copying sheet size and the magnification factor, and the region of the original other than the range $l_0'$ cannot be copied.

Accordingly, scanning the region of the original other than the range $l_0'$ with the full-speed mirror 6 is useless. Therefore, the scanning distance L of the full-speed mirror 6 can be represented by the following expression (4):

$$L = l'_0 + \Delta L = \frac{l_d}{M} + \Delta L \quad (4)$$

where $\Delta L$ is a margin for assuring that the full-speed mirror 6 scans the range $l_0'$ of the original which can be copied, at the scanning speed $V_m$, e.g. $\Delta L = AB + CD$ in FIG. 2. In FIG. 2, reference character A designates the stop position of the full-speed mirror 6; B, the start of the original; C, the end of the original; and D, the turn point of the full-speed mirror 6. The positions of the points C and D vary with the data $l_0'$ mentioned above.

Figure 3:
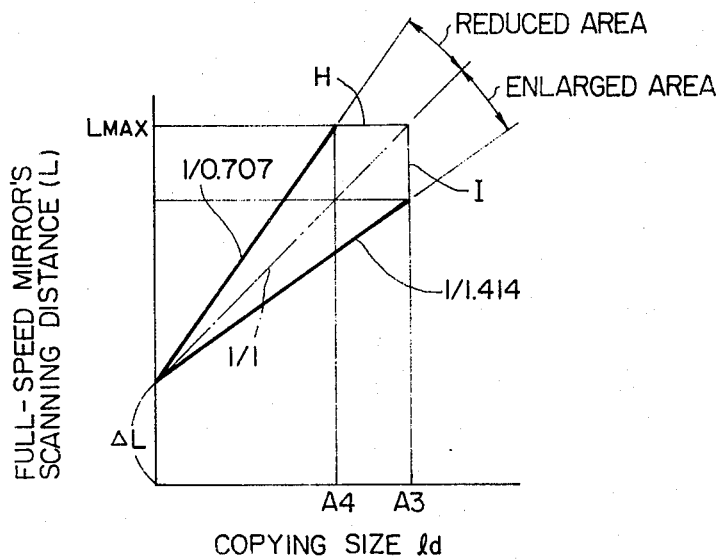
FIG. 3 is a graphical representation indicating relationships between full-speed mirror scanning distances, copying magnifications and copying sizes.

FIG. 3 is a diagram illustrating the expression (4). If it is assumed that the maximum original's size is "A3", and the size "A3" has a length $l_3$, then the maximum scanning distance $L_{MAX}$ of the full-speed mirror 6 can be represented by the following expression (5):

$$L_{MAX} = l_3 + \Delta L \quad (5)$$

In FIG. 3, the scanning distance of the full-speed mirror 6 is defined by a line H in correspondence to $L_{MAX}$, and it is further defined by a line I if the maximum copying size is "A3".

It is assmused that the copying magnification factor M is varied from 0.707× to 1.414×. Under this condition, the scanning distance L of the full-speed mirror 6 required for obtaining a maximum copying size is as follows: When the copying magnification factor M is defined by $0.707 \times \leq M \leq 1 \times$ as shown in FIG. 4, from FIG. 3.

$$L(0.707 \times \leq M \leq 1 \times) = L_{MAX} \quad (6)$$

Figure 4:
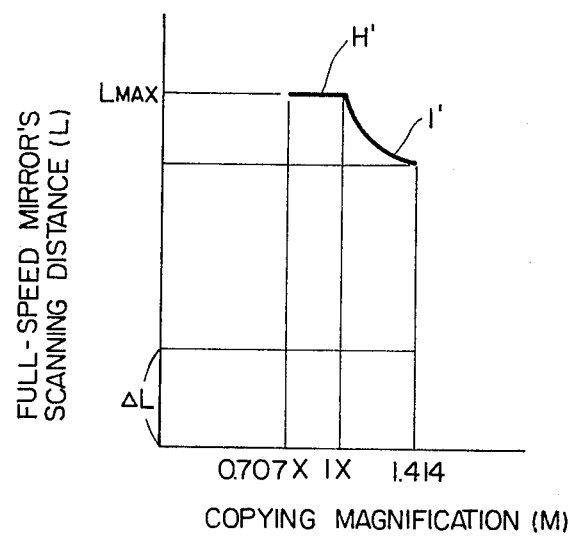
FIG. 4 is a graphical representation showing relationships between full-speed mirror scanning distances and copying magnification factors.

This is expressed by a line H" in FIG. 4, which corresponds to the line H in FIG. 3. When the copying magnification factor M is defined by $1 \times \leq M \leq 1.414 \times$, from FIG. 3

$$L (1x \leq M \leq 1.414x) = \frac{l_3}{M} + \Delta L \quad (7)$$

This is expressed by a line I' in FIG. 4, which corresponds to the line I in FIG. 3.

As is apparent from the above description, the full-speed mirror should scan as much as a distance equal to the copying size's length ($l_d/M + \Delta L$) within the scanning distance for the maximum original's size, i.e. within the maximum scanning distance $L_{MAX}$ of the full-speed mirror. It can be understood from FIG. 4 that, when the copying magnification factor is set for enlargement, the scanning distance of the full-speed mirror 6 required for obtaining the maximum copying size is decreased as the copying magnification factor is changed from $1 \times$ to $1.414 \times$.

The scanning speed and scanning distance of the full-speed mirror 6 will now be described with reference to an original whose size is other than one of the standard sizes. For instance, it is assumed that the image of an original having a length 350 mm is enlarged to the length of size "A3" in a copying operation. The length of size "A3" is 420 mm ($=l_d$), and therefore the copying magnification factor M is $1.2 \times (=420/350)$. If $V_d = 100$ mm/sec, then from the expression (3) the full-speed mirror's scanning speed $V_m$ is:

$$V_m = \frac{1}{1.2} \times 100 \approx 83.3 \text{ (mm/sec)}$$

If $\Delta L = 50$ (mm), then from the expression (4) the full-speed mirror's scanning distance L (M=1.2) is:

$$L (M=1.2) = 420/1.2 + 50 = 400 \text{ (mm)}$$

Therefore, in this case, 1.2× is selected as the copying magnification factor, and the full-speed mirror 6 should scan as much as a distance of 400 mm at a speed of 83.3 mm/sec.

As is clear from the above description, the scanning speed and distance of the full-speed mirror depend on the original's size, the copying magnification factor and copying sheet size. By controlling the scanning speed and distance of the full-speed mirror according to the above-described principle, an original whose size is other than one of the standard ones can be copied as an image having a desired size. Since the mirror scanning distance can be reduced to a necessary minimum value, the scanning time can be reduced, and when the copying magnification factor is set for enlargement, the movement region of the lens system of the magnification varying device can be extended towards the half-speed mirrors. I.e., when the machine is set for enlargement, it is necessary to move the zoom lens components, and minimizing the travelling distance of the half-speed mirrors will leave more room for the zoom lens to be adjusted.

The principle of controlling the full-speed mirror driving mechanism according to the present invention is as described above. One example of the full-speed mirror driving mechanism based on the above-described principle will now be described with reference to FIG. 5.

As shown in FIG. 5, a contact glass 2 is laid on the front surface of a copying machine body (not shown), and the operating member 22 of a full-speed mirror 6 is provided in the copying machine in such a manner that the operating member 22 is reciprocated below the contact glass 2. The operating member 22 has a surface inclined 45° with respect to the contact glass 2, on which the full-speed mirror 2 is placed. One end portion of operating member 22 is slidably supported on a guide bar 24 which is set in parallel with the contact glass 2 at one side of the copying machine. A small diameter roller 26 is rotatably supported on the other end portion of the operating member 22, so that it is turned along the groove of a guide rod 25 having a U-shaped section which is set at the other side of the copying machine. A wire fastening protrusion 29, to which a wire 28 (described later) is fastened, is provided at the one end portion of the operating member 22. A holding member 23 holds half-speed mirrors 7 and 8. The half-speed mirrors 7 and 8 are adapted to scan as much as a half of the scanning distance of the full-speed mirror 6 at a speed which is a half of the scanning speed of the full-speed mirror 6 in the same distance. One end portion of the holding member 23 is slidably supported through its supporting part by the guide bar 24. A roller 27 is rotatably provided on the other end portion of the holding member 23, similarly as in the case of the roller 26. The roller 27 is also turned along the groove of the guide rod 25. The holding member 23 is made up of upper and lower slanting plates forming a 90° angle with respect to each other, on which the half-speed mirrors 7 and 8 are provided, respectively. The upper half-speed mirror 7 reflects original image light from the full speed mirror 6 towards the lower half-speed mirror 8, while the lower half-speed mirror 8 transmits the light reflected from the half-speed mirror 7 to the zoom lens system 9 of the magnification varying device 11 as shown in FIG. 2. As a result, the image of the original is enlarged or contracted by the zoom lens system 9 and is applied through the reflecting mirror 10 to the photo-sensitive drum 13 where an image is formed on the outer wall of the latter 13.

A pair of rollers 30a and 30b are disposed on one side of the supporting part of the half-speed mirror holding member 23, and are used to wind the wire 28 as described later. A wire pulley 31 is rotatably mounted on the copying machine body. The wire 28 for causing the full-speed mirror 6 and the half-speed mirrors 7 and 8 to scan is wound several turns around the wire pulley 31. A first half of the wire 28 is laid over one of the pair of the small diameter pulleys 32a and 32b which are rotatably mounted on the copying machine body is then passed around a pulley 33, and is then fastened to the wire fastening protrusion 29 of the full-speed mirror operating member 22. The first half of the wire 28 thus fastened is further wound around the roller 30a on the supporting part of the half-speed mirror holding member 23, and the end of the first half of the wire 28 is then fastened to a wire fastening member 34 which is provided inside the copying machine body for adjusting the tension of the wire 28. The remaining half of the wire 28 is laid over a tension pulley 36 urged towards the wire by a spring 35, and is then wound on the small diameter pulley 32b. The remaining half of the wire 28 is further laid over a pulley 37 and is then wound on the other roller 30b on the half-speed mirror holding member 23. Finally, the end of the remaining half of the wire 28 is fastened to the copying machine body.

A mirror driving motor 39 is mounted on the copying machine body. The mirror driving motor 39 is of the type (such as a conventional DC servo motor or pulse motor) which is controlled by numerical control. The motor 39 has a speed detector 40 (such as a conventional tachometer generator or a pulse generator), and a pair of timing pulleys 41a and 41b are secured to the drive shaft of the motor 39. A timing belt 42 is laid over the timing pulley 41a and around a timing pulley 38 which is coaxial with and integral with the aforementioned wire pulley 31. A belt 45 is laid over the other timing pulley 41b and around a timing pulley 44 which is coaxial with and integral with a position detector 43 such as a rotary encoder. Therefore, as the mirror driving motor 39 is rotated in one direction or in the opposite direction, the timing pulley 38 and the wire pulley 31 are turned to pull the wires 28 in one direction, so that the full-speed mirror 6 and the half-speed mirrors 7 and 8 are reciprocated, while the scanning speed and the position of the full-speed mirror 6 are detected by the speed detector 40 and the position detector 43, whereby signals representative of the scanning speed and position thus detected are applied to a control system (described later).

A motor 47 for driving the photo-sensitive drum 13 is mounted on the copying machine body, and rotates at a constant speed. A pair of timing pulleys 48a and 48b are fixedly secured to the drive shaft of the motor 47. A belt 49 is laid over the timing pulley 48a and around a timing pulley 46 on one end of the photo-sensitive drum 13. A belt 52 is laid over the other timing pulley 48 and also around a timing pulley 51 secured to the shaft of a position detector 50 which is mounted on the copying machine body.

Figure 6:
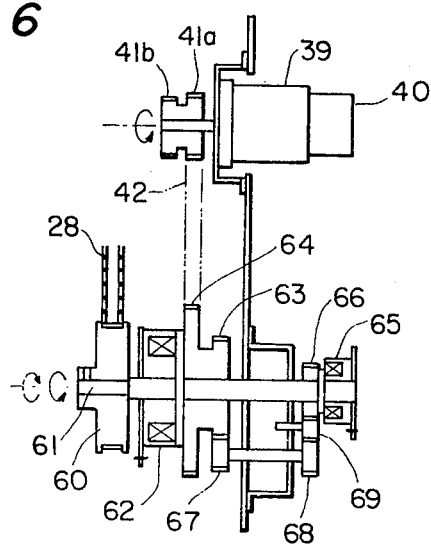
FIG. 6 is a sectional view of a clutch mechanism.

FIG. 6 shows another means for reciproctaing the scanning mirrors without alternating the directions of rotation of the mirror driving motor 39. A shaft 61 is rotatably mounted on the copying machine body. A pulley 60 similar to the aforementioned wire pulley 31 is fixedly mounted on the shaft 61 and a timing pulley 64 is rotatably mounted on the shaft 61. A gear 63 is formed on the timing pulley 64. The gear 63 can be fixedly coupled to the shaft 61 by an electromagnetic clutch 62. A belt 42 is laid over the timing pulley 64 and over the timing pulley 41a fixedly secured to the drive shaft of the mirror driving motor 39. A gear 66 is rotatably mounted on the shaft 61 and can be fixedly coupled to the shaft 61 by an electromagnetic clutch 65. The gear 66 is engaged with a pinion 69. The pinion 69 is engaged with a gear 68 which is fixed coaxially to a gear 67 which is engaged with the gear 63 of the timing pulley 64. Therefore, the rotation of the timing pulley 64 is transmitted through the gears 67, 68 and 69 to the gear 66; however, the direction of rotation of the gear 66 is opposited to that of the timing pulley 64.

It is assumed that the drive shaft of the driving motor 39 is turned in the direction of the solid line arrow. When the electromagnetic clutch 62 is actuated, the gear 63 is fixedly coupled to the shaft 61, so that the wire pulley 60 is turned in the direction of the solid line arrow; and when the electromagnetic clutch 65 is operated, the gear 66 is fixedly coupled to the shaft 61, so that the wire pulley 60 is turned in the direction of the dotted line arrow. Accordingly, the control system in the copying machine body can reciprocate the mirrors without alternating the directions of rotation of the mirror driving motor 39, i.e., with the motor 39 turning in one direction only. Thus, the control system can be simpler in arrangement.

The control system for the drive mechanism described above will now be described.

The operator determines magnification factor data, copying sheet size data and number-of-copying-sheets data as input data to be applied to the copying machine before a copying operation. Among these data, the copying sheet size data and the magnification factor data are utilized to determine the scanning speed and scanning distance of the full-speed mirror. The control system is adapted to control the mirror driving motor 39 which is numerically driven with such data.

One concrete example of the control system will be described.

The magnification factor data and the sheet size data are coded as shown below:

```
10 9 8 7 6 5 4 3 2 1 0
```

| | | |
|---|---|---|
| 0th to 6th bits | Magnification factor data | (128 kinds) |
| 7th to 8th bits | Data select code | (4 kinds) |
| 9th to 10th bits | Sheet size data | (4 kinds) |

The 7th and 8th bits are called a "data select code" and are data for instructing the selection of the scanning speed and scanning distance of the full-speed mirror in accordance with the magnification factor data and the sheet size data. The select code is defined as follows:

| 8 | 7 | Contents |
|---|---|---|
| 0 | 0 | Scanning mirror speed data 1 (8 bits) |
| 0 | 1 | Scanning mirror speed data 2 (8 bits) |
| 1 | 0 | Scanning mirror movement distance data 1 (8 bits) |
| 1 | 1 | Scanning mirror movement distance data 2 (8 bits) |

Successive incrementing of the 7th and 8th bits of data is effected to form address data to access a memory unit (not shown) in which the aforementioned data (1) and (2) are stored, so that necessary data are successively read out so as to be latched in a speed data buffer and a movement distance buffer.

The entire 10 bits shown above are provided to a memory which has stored therein all possible scanning speeds and movement distances for the full speed mirror. The $7^{th}$ and $8^{th}$ bits are then cycled as shown above to read the speed and distance data into appropriate buffers. At "00" and "01" the memory provides to a speed data buffer a (described later in FIG. 7) a total of 16 bits of speed data as determined by the magnification factor and sheet size specified in address bits 0–6 and 9–10. At "10" and "11" the memory provides to a movement distance data buffer b (described later) a total of 16 bits of distance data similarly corresponding to the set magnification factor and copy sheet size.

Figure 7:
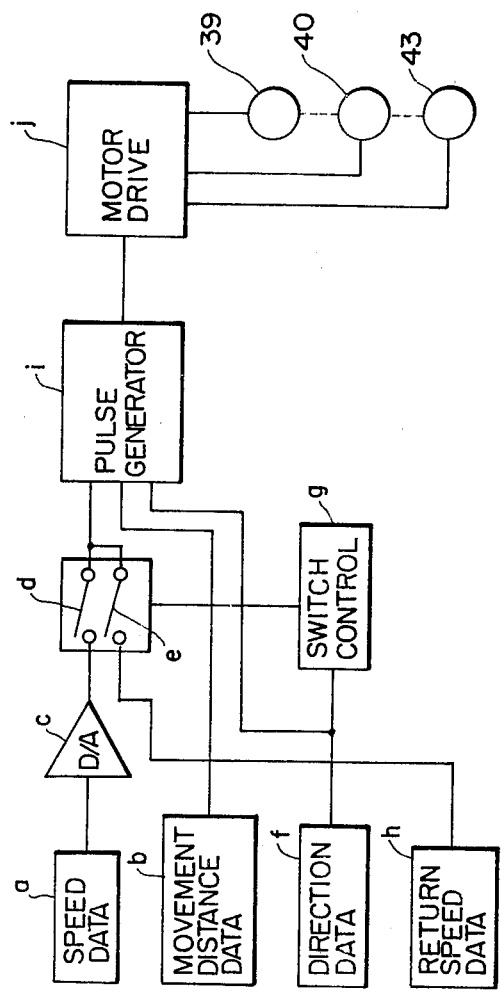
FIG. 7 is a block diagram showing a control system.

Referring to FIG. 7, data (16 bits) of a speed data buffer a is converted into an analog voltage value by a digital-to-analog converter c (hereinafter referred to as "a D/A converter c"). The analog voltage value is applied to an analog switch d. A sequence of direction instructing data is stored in a direction data buffer f, to instruct the direction of rotation of the motor. That is, the data f is applied to the pulse generator i to turn the motor clockwise for forward scanning motion and then counterclockwise for returning motion. The direction instructing data f is also applied to an analog switch control circuit g to select one of the analog switches d and e. Returning speed data h is provided, as an analog voltage value, to instruct a speed for the returning motion. For the forward motion, the analog switch d is turned on, and the analog switch e is turned off. For the returning motion, the analog switch d is turned off, and the analog switch e is turned on, so that the returning speed data h is applied to a pulse generating circuit i, to control the pulse rate and therefore determine the maximum speed. The pulse generating circuit i, receiving the speed data through the analog switches d and e, the data from the movement distance data buffer b (16 bits) and the direction instructing data f, generates appropriate pulses. By applying the output pulses of the pulse generating circuit i to a conventional motor drive j to which the speed detector 40 and the position detector 43 have been connected, the mirror driving motor 39 can be readily operated.

As the mirror driving motor thus arranged is rotated, the wire pulley is turned and the wire is run. In this operation, the full-speed scanning member (which is the full-speed mirror) secured to the wire scans at the same speed as the speed of the wire, while the half-speed scanning member (which is made up of the half-speed mirrors) scans at a speed which is a half of the speed of the wire (i.e. at half the speed of the full-speed scanning member) because of the presence of the pulleys. At the same time, the scanning speed of the full-speed mirror is detected by the speed detector, while the scanning distance is detected by the position detector. The scanning speed and the scanning distance are fed back to the control system in the copying machine. Thus, the control system in the copying machine drives the mirror driving motor so that the full-speed mirror is reciprocated in conformance to the scanning distance and speed which depend on an original's size, and a copying magnification factor and a copying size which are specified.

In this invention, the driving motor for scanning the mirrors is numerically controlled, and the position detector for detecting the mirror scanning distance and the speed detector for detecting the mirror scanning speed are additionally provided for the copying machine. Therefore, the mirror scanning speed which varies with copying magnification factor can be continuously changed. Accordingly, even if the size of an original is not a standard one, the magnification factor can be selected as desired.

Furthermore, according to this invention, the mirror scanning distance which depends on an original's size and specified copying magnification factor and copying size can be fully scanned without extra, unnecessary scanning. Therefore, the mirror scanning control mechanism of the invention can readily respond to the mirror scanning distance which is reduced when the magnification factor is set for enlargement, thus and the system is high in efficiency. Furthermore, since the magnification varying device is shifted towards the original, the mirror scanning control mechanism is efficient in its utilization of space, and accordingly the size of the copying machine can be decreased.

What is claimed is:

1. In a copying machine of the type having means for holding an original document in a substantially fixed position, a full speed mirror, movable a scanning distance which is at least the length of said original at a scanning speed for reflecting light from said original, half-speed mirrors movable in synchronism with said full speed mirror at substantially half the speed thereof for receiving and reflecting said light from said full speed mirror, a magnification varying device including a zoom lens system for receiving said reflected light from said half-speed mirrors and for varying the magnification factor of said copy machine, and a recording medium for receiving said light from said magnification varying device and recording an image of said original with a desired magnification factor, a mirror scanning control mechanism comprising:

control means for controlling said scanning speed in accordance with at least said desired magnification factor.

2. A mirror scanning control mechanism as claimed in claim 1, wherein said scanning speed is substantially continuously variable in accordance with said desired magnification factor.

3. A mirror scanning control mechanism as claimed in claim 1, wherein said scanning distance is variable in accordance with said desired magnification factor.

4. A mirror scanning control mechanism as claimed in any one of claims 1, 2 or 3, wherein at least one of said scanning speed and scanning distance is also variable in accordance with the size of said original.

5. A mirror scanning control mechanism as claimed in any one of claims 1-3, wherein at least one of said scanning speed and scanning distance is also variable in accordance with the size of said recording medium.

6. A mirror scanning control mechanism as claimed in any one of claims 1-3, wherein the light from said magnification varying device moves across said recording medium at a speed $V_d$ and said scanning speed is defined substantially by $V_m = V_d/M$, where $V_d$ is said scanning speed and M is said magnification factor.

7. A mirror scanning control mechanism as claimed in any one claims 1-3, wherein said scanning distance is given by $L = (l_d/M) + \Delta L$, where L is said scanning distance, $l_d$ is the length of said recording medium, M is said magnification factor and $\Delta L$ is a constant greater than or equal to zero.

8. A mirror scanning control mechanism as claimed in any one of claims 1-3, wherein said scanning distance is given by $L = l_3 + \Delta L$ for $M < a$, where L is the scanning distance, $l_3$ is the maximum permissible length of an original, $\Delta L$ is a constant greater than or equal to zero, M is said magnification factor and a is a predetermined magnification value.

9. A mirror scanning control mechanism as claimed in claim 8, wherein said scanning distance is given by $L = (l_3/M) + \Delta L$ for $M > a$.

10. A mirror scanning control mechanism as claimed in any one of claims 1-3, wherein said control means for controlling said scanning speed comprises:

pulse generating means for generating pulses in accordance with a desired scanning speed data and scanning direction data; and a pulse motor for moving said full-speed mirror in accordance with said pulses.

11. A mirror scanning control mechanism as claimed in claim 10, wherein said control means further comprises distance detection means for generating a signal representing the position of said full-speed mirror, and said pulse generating means terminates said pulses when said full-speed mirror has moved said scanning distance.

12. A mirror scanning control mechanism as claimed in claim 10, wherein said control means further comprises detection means for detecting the actual scanning speed of said full-speed mirror, and said pulse generating means generates pulses such that said desired and actual scanning speeds are substantially the same.

* * * * *